March 1, 1938. C. B. H. COLQUHOUN 2,109,818
VENTILATING PLANT
Filed Oct. 29, 1935       7 Sheets-Sheet 1

Inventor:
C. B. H. Colquhoun
By: Mason & Porter
Attorneys

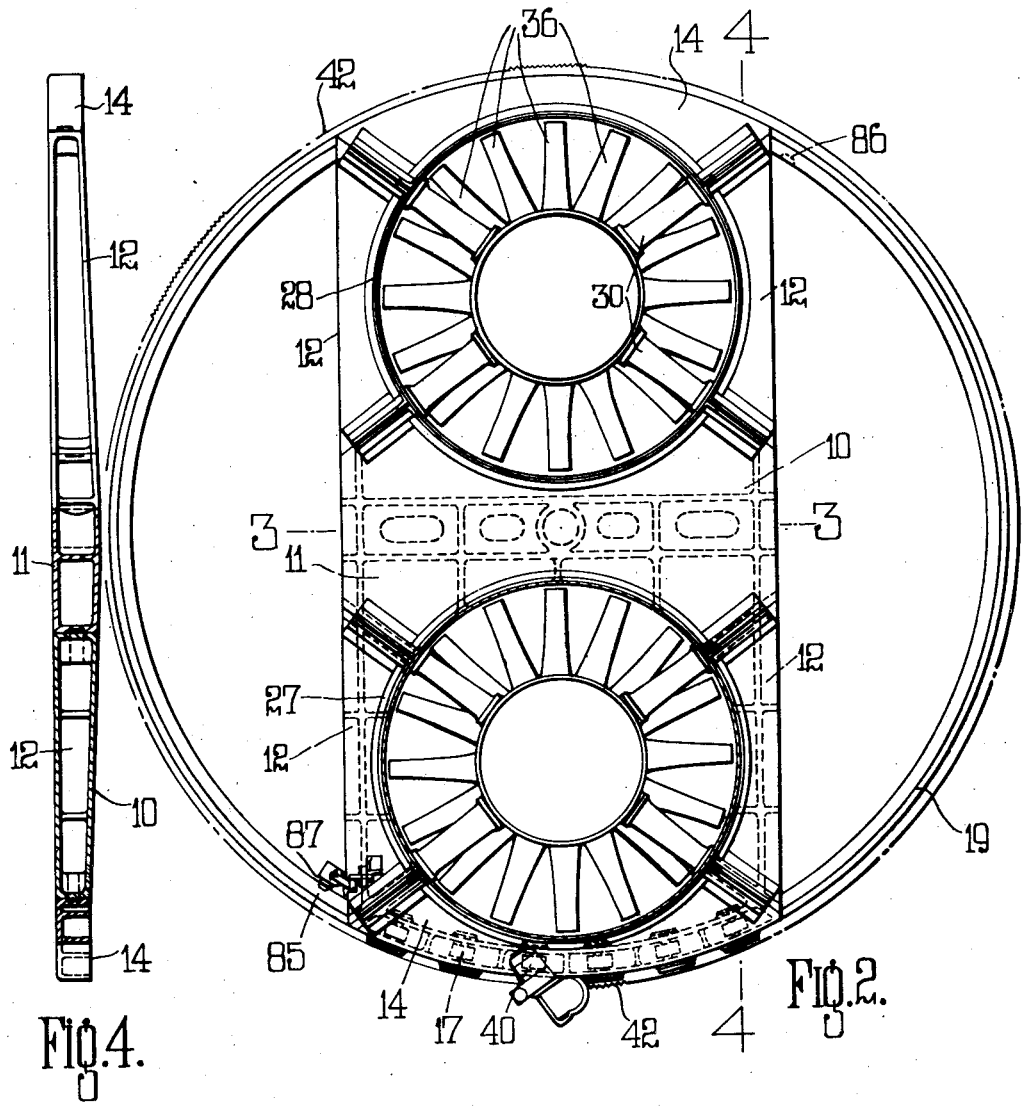
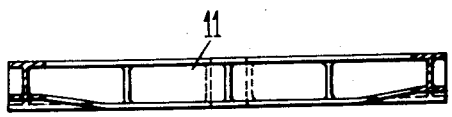

March 1, 1938. C. B. H. COLQUHOUN 2,109,818
VENTILATING PLANT
Filed Oct. 29, 1935   7 Sheets-Sheet 4
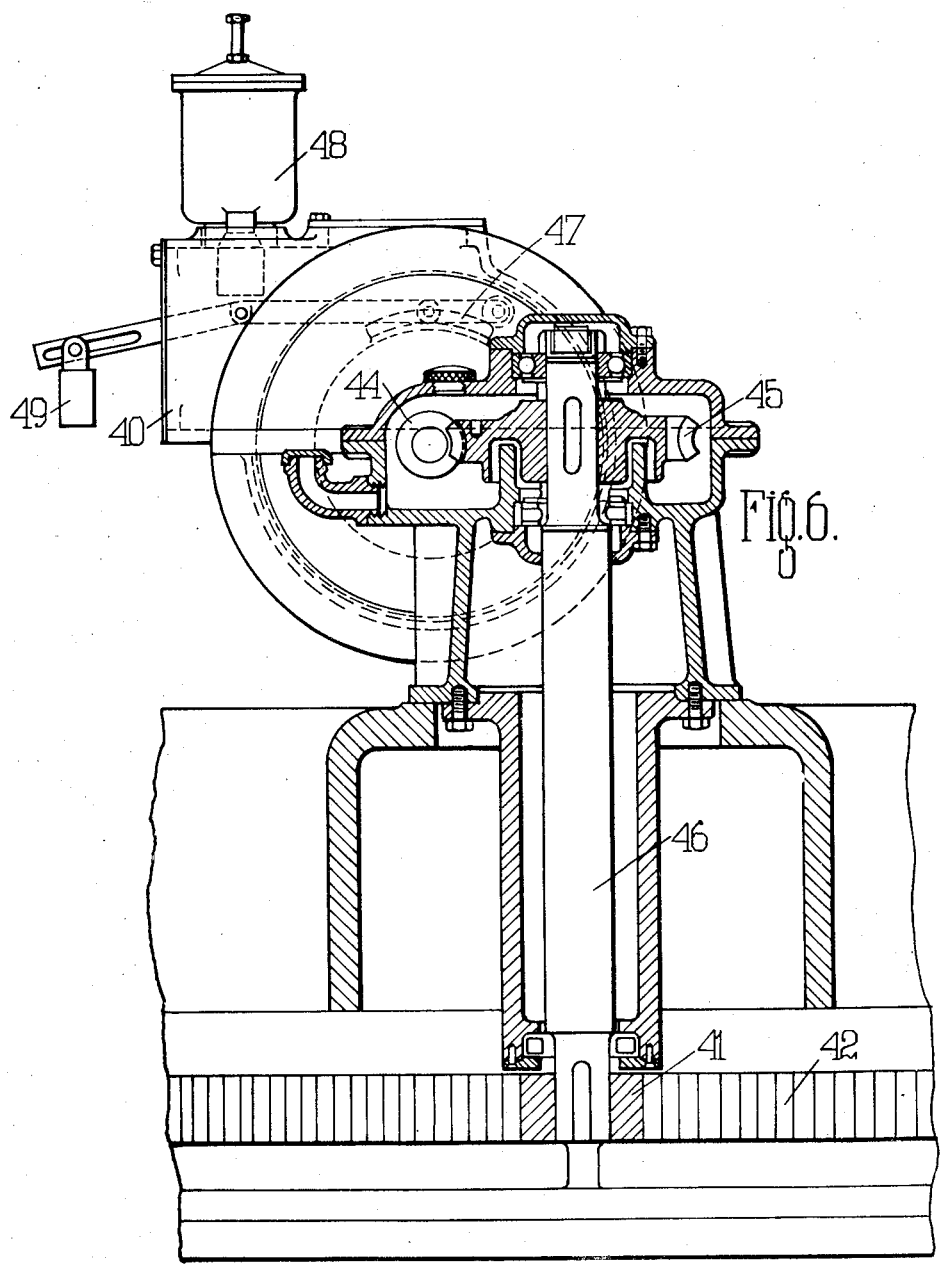
Inventor:
Cecil B. H. Colquhoun
By: Mason & Porter
Attorneys

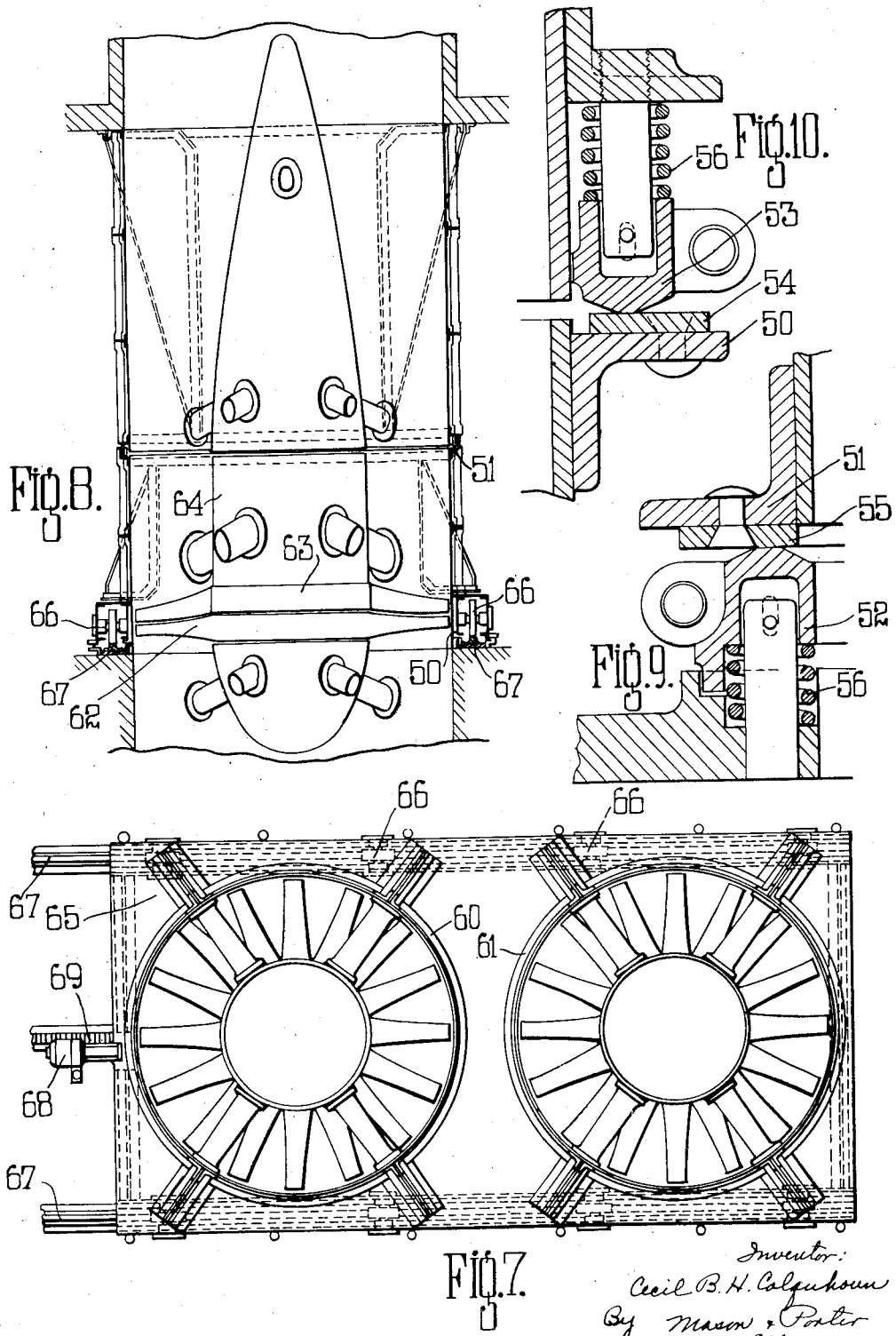

March 1, 1938. C. B. H. COLQUHOUN 2,109,818
VENTILATING PLANT
Filed Oct. 29, 1935 7 Sheets-Sheet 7

Inventor:
Cecil B. H. Colquhoun
By: Mason, Porter
Attorneys

Patented Mar. 1, 1938

2,109,818

UNITED STATES PATENT OFFICE 2,109,818

VENTILATING PLANT

Cecil Brian Hugh Colquhoun, London, England

Application October 29, 1935, Serial No. 47,328
In Great Britain February 2, 1935

5 Claims. (Cl. 98—49)

The present invention relates to ventilating plant and is particularly applicable to ventilating installations of tunnels, mines and the like.

The invention is very applicable to the ventilation of road tunnels for automobile vehicles.

The invention concerns the arrangement of fans or impellers in groups of more than one, usually in pairs, to enable them to be used alternately in conjunction with a given air-way or duct, whereby the ventilation can be continued by the operation of one fan or other at will.

In most ventilating installations, the main airway is bifurcated to provide separate communications therefrom to two fans and this involves a very considerable amount of expense particularly in the case of a large ventilating installation, for instance, for a road tunnel, as the ducts for each fan are of very large dimensions. Moreover this type of fan installation involves the arrangement of the fans in a large chamber to provide a common inlet or common outlet to the two fans and this again involves very great expense. Furthermore this type of ventilating installation entails a considerable loss in efficiency on account of the changes in the direction of flow and the frictional effect of the bifurcations and also on account of the loss in speed of the air as it enters the chamber which is common to the two fans.

Again, if a ventilating installation of the aforesaid type is applied to a large tunnel or the like, which necessitates a large site of suitable shape, and where a site of suitable shape and dimensions is not available, further efficiency losses may be encountered by the necessity for adopting fan outlets and duct shapes of unsuitable design.

According to the present invention, a group of fans of the axial flow or propeller type, preferably two in number. is displaceably arranged with respect to an air-way or duct so that one fan may be taken out of operation and another put into operation by displacement of a group of fans bodily to take one fan out of line with the air-way, and to bring another fan into line with the air-way.

According to another aspect of the invention, a group of fans of the axial flow or propeller type, preferably two in number is introduced between a pair of aligned ducts and is displaceable transversely of the ducts, that is, in a plane normal to the axis of the ducts. The fans are preferably arranged so as to be displaceable either linearly or along an arc of a circle, that is to say, the fans may be mounted upon a suitable carriage supported by wheels upon guide rails or they may be mounted upon a pivoted turn-table, quadrant or the like.

The displacement may be effected by any suitable mechanism, for instance, a driven pinion, mounted upon a carriage, may engage a fixed rack or a driven threaded spindle secured to the carriage may engage in a fixed nut. Again, a turn-table or quadrant may be rotated by any suitable toothed gear.

The displacement is preferably effected by electric motors remotely controlled and suitable stop means may be provided for limiting the movement of the carriage, turn-table or the like for bringing the fans correctly into their positions relatively to the air-ways.

Each fan may be driven by a separate electric motor which may be mounted at the hub of the fan, but if desired, the axis of the motor may be spaced from the axis of the fan and the fan may be driven for instance by a belt or rope from the motor. Each fan may be enclosed by a suitable sleeve or duct which may be of Venturi or cylindrical section, the inlets and outlets of the sleeves or ducts being of diameter corresponding to the respective ends of the ducts or ventilating shafts from and to which the fan is adapted to draw and discharge.

It is advisable for each sleeve when in operative position to fit closely against and to be substantially sealed in relation to the end of the ventilating shaft on that side thereof remote from the atmosphere i. e. the ventilating shaft leading to the region to be ventilated. When the sleeves are adapted to fit between two ventilating shafts one leading to atmosphere and the other leading to the space to be ventilated, the junction between both ends of the sleeve in operative position and the ends of said shafts may be substantially sealed but the sealing is more particularly desirable between the sleeve and the shaft end remote from atmosphere.

For the purpose of such sealing a relatively short auxiliary sleeve or ring may be arranged at the mouth or end of a ventilating shaft or at the end of a sleeve and capable of axial displacement to mask the junction between such shaft end and sleeve. Such auxiliary sleeve or ring may be positively withdrawn from its sealing position to enable the fan and sleeve to be withdrawn from their operative positions or alternatively it may be resiliently pressed into its sealing position and capable of automatic withdrawal on displacement of the sleeve and fan.

An alternative form of seal may consist of arcuate sealing segments forming a ring and resiliently mounted on the shaft end or sleeve for engagement with a flange on the sleeve or shaft end.

The invention is more particularly described with reference to the accompanying drawings in which—

Figure 2 is a sectional plan view on the line 2—2—2 of Figure 1.

Figure 3 is a sectional view of the rotatable turntable taken on the line 3—3 of Figure 2.

Figure 4 is a sectional view of the rotatable turntable taken on the line 4—4 of Figure 2.

Figure 6 is a sectional side view showing the driving gear of Figures 1 and 2.

Figure 7 is a plan view of an arrangement in which the fans are mounted for linear displacement.

Figure 8 is a part-sectional elevation corresponding to Fig. 7.

Figures 9 and 10 are part-sectional elevational views of a top seal and bottom seal respectively which are applicable to the arrangements of Figures 1 and 2 and Figures 7 and 8.

Figure 11:
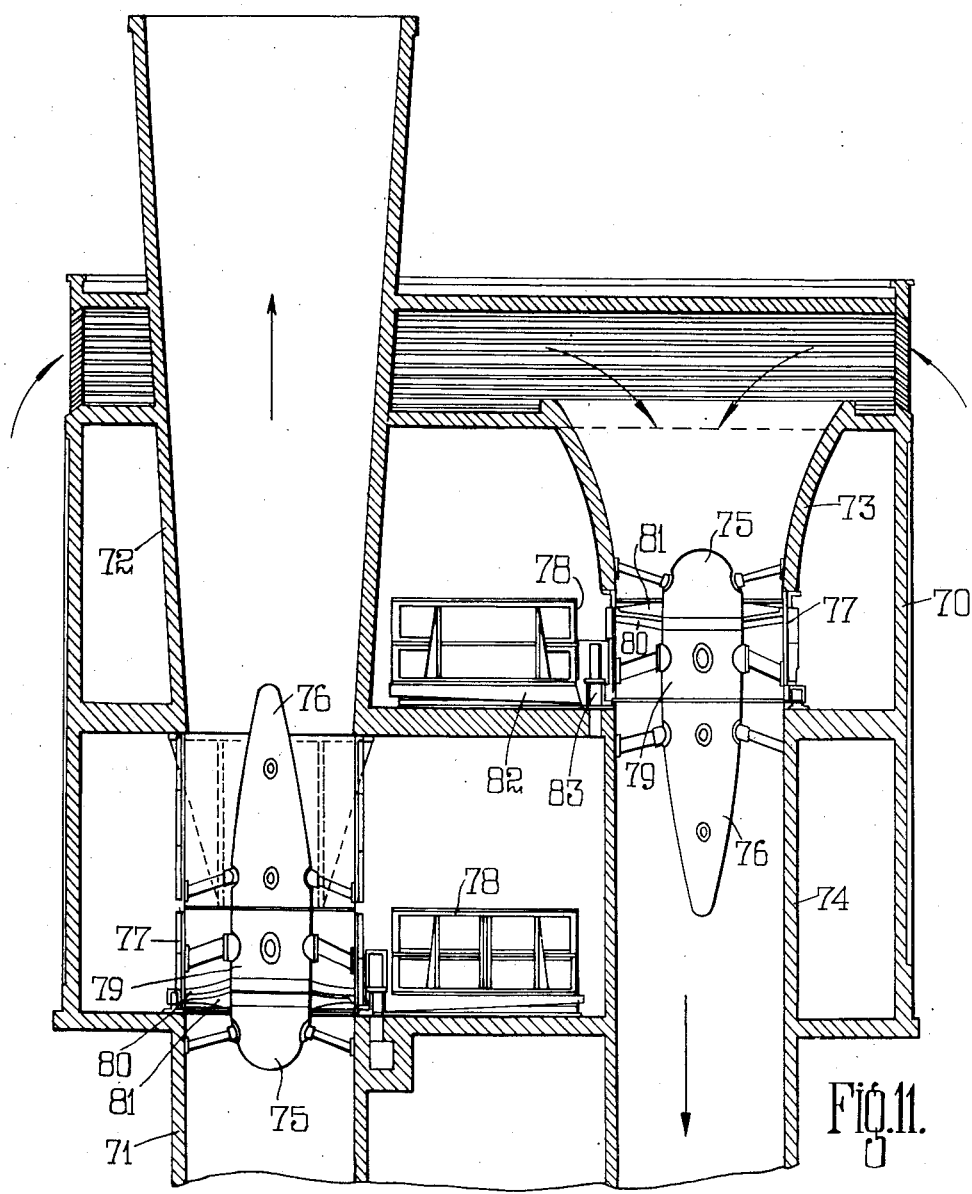
Figure 12:
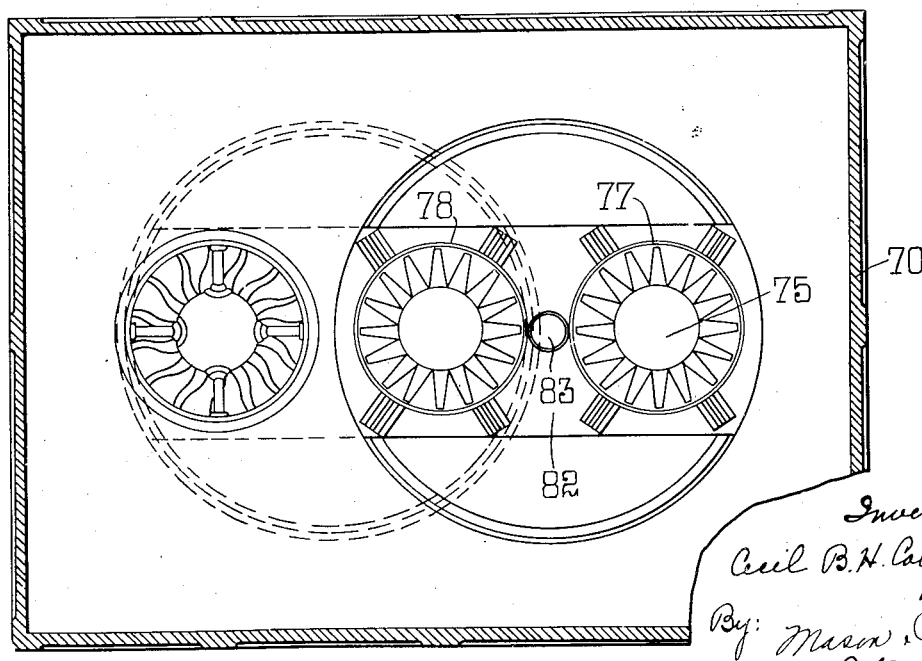

Figures 11 and 12 are a sectional elevation and plan view respectively of a complete installation.

Figure 13:
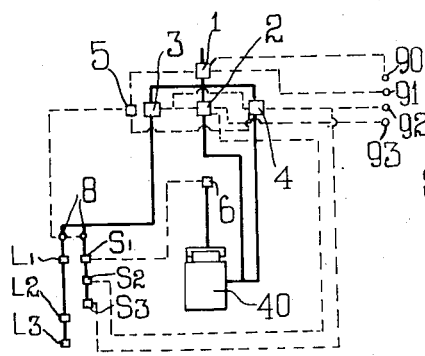
Figure 14:
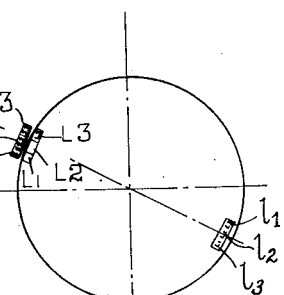

Figures 13 and 14 are diagrammatic illustrations of the electrical control gear.

Figures 15, 16:
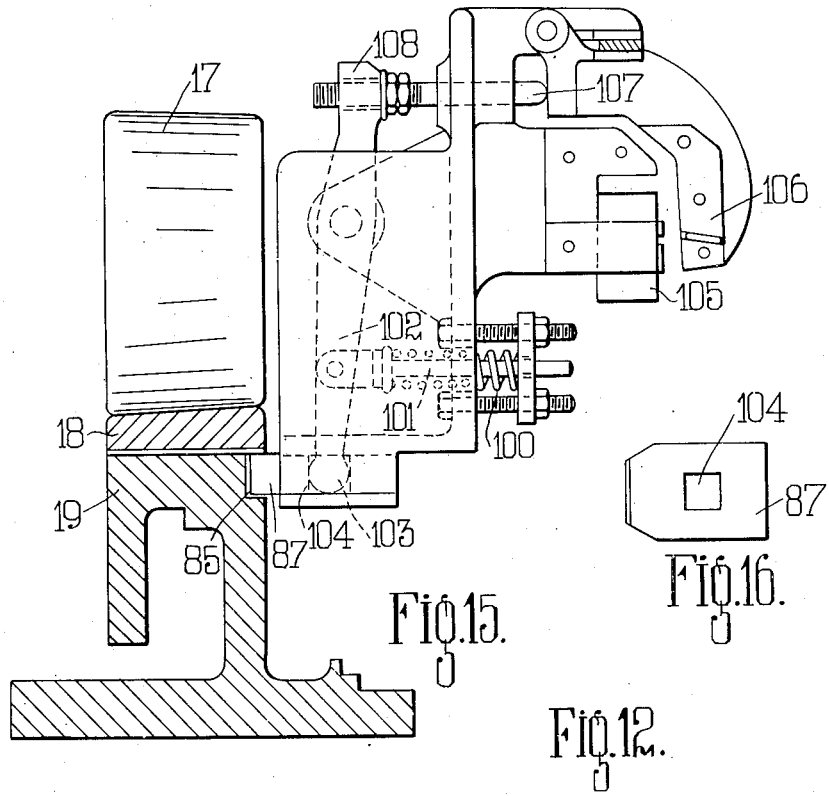

Figure 15 is a view of a detent or locking mechanism.

Figure 16 shows a detail.

Figure 1:
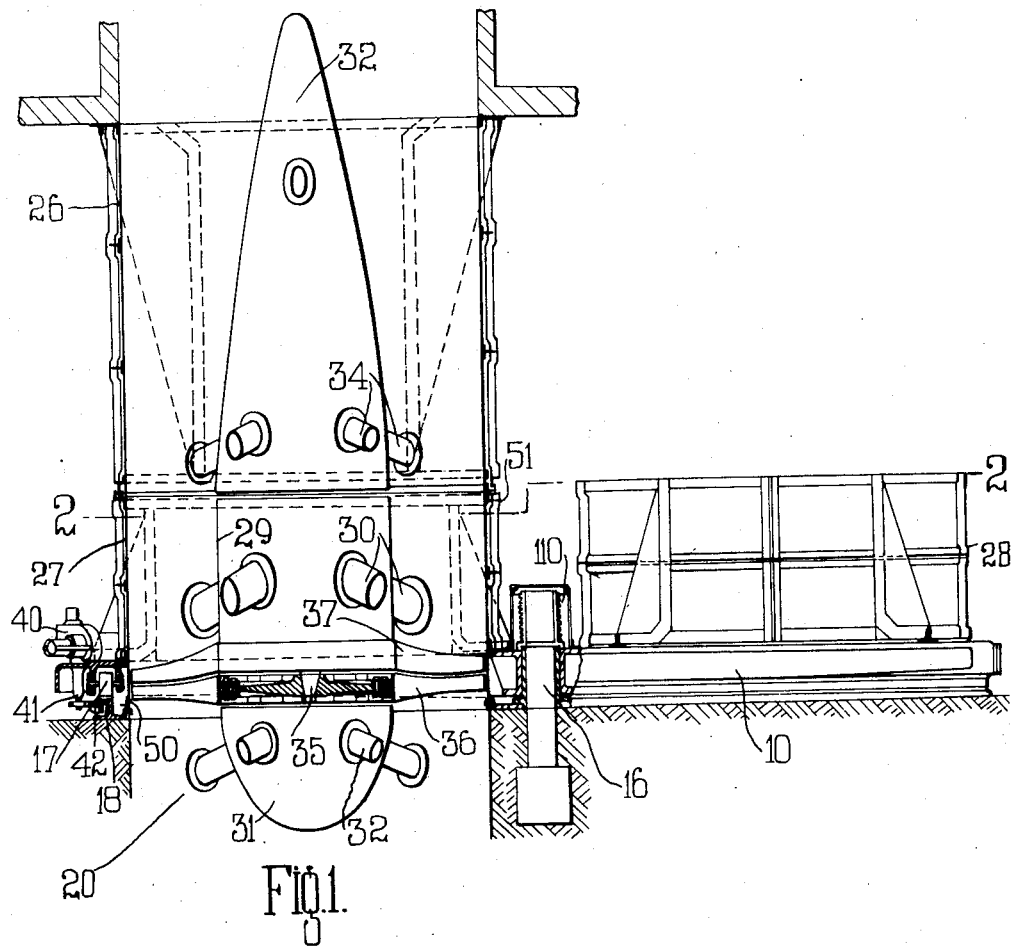
Figure 1 is a part-sectional elevation of one form of construction in which the fans are mounted for rotational or arcuate displacement.
Figure 5:
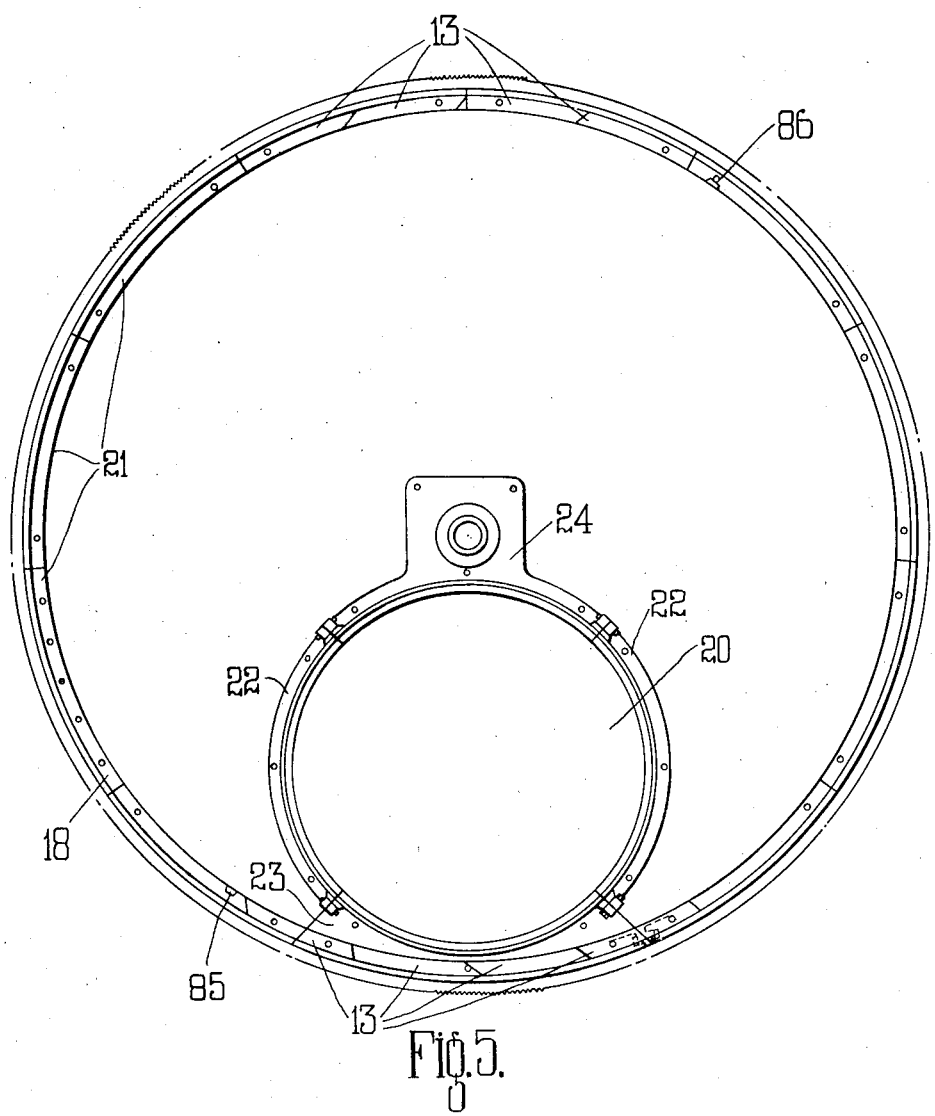
Figure 5 is a plan view of the supporting base of Figures 1 and 2.

In the arrangement shown in Figures 1 and 2, a carriage or turntable 10 built up of suitable cast sections 11, 12, 14, is adapted for angular displacement on a vertical pivot 16 and is supported by conical rollers 17 upon a track 18 suitably bevelled to correspond with the conicity of the rollers 17 and formed upon a circular base 19 which is eccentrically disposed relatively to a ventilating shaft 20. The base 19 is built up of sections 21 and 22, (see Fig. 5) the sections 21 and 22 being interconnected by a section 23 and the sections 22 interconnected with the pivot anchorage by means of a section 24. The arrangement shown in Figure 1 is suitable for the exhaust side of a ventilating system and the ventilating shaft 20 is aligned with an outlet ventilating shaft 26.

The turntable 10 has mounted thereon on diametrically opposite sides of the pivot 16, two cylindrical sleeves or fan casings 27, 28 adapted to fit between the ventilating shafts 20, 26. Within each sleeve is concentrically disposed a streamlined fairing element 29 supported by stays 30 from the sleeve, such fairing element being aligned with suitable complementary fairing elements 31, 32 disposed within the ventilating shafts 20 and 26 by suitable stays 33, 34. The fairing element 29 encloses an electric motor the end of the shaft 35 of which can be observed in Fig. 1. The motor shaft 35 is secured to an axial flow propeller 36 which is driven thereby. Fixed guide vanes 37 are supported by the fairing element 29 immediately above the propeller 36.

The sleeve 28 is similarly equipped with a fairing element 29, guide vanes 37, propeller 36 and driving motor, and the equipment within the sleeve 28 can be brought into position between the ventilating shafts 20, 26 by angular displacement of the turntable 10 through 180°.

For the sake of clearness only two opposite propeller blades 36 and two guide vanes 37 are shown in Figure 1.

As stated above the turntable is supported on the track 18 by rollers 17 and the track is provided with replaceable portions 13 (Fig. 5) which are preferably formed of hardened steel extending over the diagonally opposite parts of the track upon which the rollers 17 rest when the turntable is in the stationary position.

The turntable is rotated by means of a motor 40 operating through gears shown in Fig. 6 to drive a pinion 41 which engages a stationary toothed rim 42 extending around the base 19. As will be seen from Fig. 6 the motor 40 drives a worm 44 in mesh with a worm wheel 45 which is keyed to a vertical shaft 46 to the end of which is keyed the pinion 41 engaging with the toothed rim 42. The motor is provided with a brake 47 which is released by means of an electromagnet 48 and applied by a weight 49. Alternatively, of course, the brake may be applied by a spring.

The pivot 16 is hollow and is provided with slip rings 110 adapted for connection to electric supply cables passing up the pivot and for engagement on their exterior with brushes whereby current can be conducted to the electric motors on the turntable and to control gear or other electrical gear which may be arranged on the turntable.

To effect a seal between the sleeve 27 or 28 and the mouths of the ventilating shafts 20, 26 flanges 50, 51 are arranged at the lower and upper edge respectively of the sleeves for engagement with sealing segments 52, 53 respectively arranged at the mouths of the ventilating shafts 20, 26 (Figs. 1, 9 and 10). Flanges 50, 51 are provided with suitable liners 54, 55 (see Figs. 9 and 10). The sleeve segments are of arcuate form and extend completely around the periphery of the mouths of the shafts and the circumference of each seal may be made up for instance of say eight segments of 45° each. The segments 52, 53 are pressed upwardly and downwardly towards the flanges 51, 50 respectively by means of springs 56 and have bevelled surfaces to enable the flanges on engagement therewith to press the segments outwardly to an extent sufficient to permit displacement of the sleeve into its position of alignment with the ventilating shafts 20, 26.

The provision of a seal at the lower end of the sleeve is more important than at the upper end and the sealing means at the upper end of the sleeve could be eliminated without serious loss of efficiency.

The sealing arrangement shown in Figures 9 and 10 is equally applicable to the form of construction shown in Figures 7 and 8 wherein a pair of sleeves 60, 61, each containing a motor, propeller 62, guide vanes 63 and guide elements 64 are mounted upon a common supporting baseplate 65 which is borne through rollers 66 on fixed rails 67, the carriage 65 together with the sleeves and vanes are linearly displaced by means of a motor 68 which drives a pinion engaging a fixed rack 69.

For the purpose of locating the carriage or turntable in correct position with one of the sleeves in alignment with the ventilating shaft diagonally opposite openings 85, 86 (Figs. 2 and 5) are formed in the base 19 for the reception of a tapered or conical plunger or detent 87 mounted on the carriage and which is spring-loaded and electromagnetically released. A similar plunger may be provided in the arrangement shown in Fig. 7 for engagement in suitable notches or openings in the base or in the rails 67.

The actuating gear for the detent or plunger 87 is shown in Figure 15 and the detent itself is shown in Figure 16.

Figure 15 also shows the sectional form of the base 19 and the track 18 which is bevelled or inclined radially outwardly corresponding to the conical form of the rollers 17.

The detent 87 is normally engaged on the notch or opening 85 or 86 under the influence of a spring 100 operating through a rod 101 upon a pivoted lever 102 which engages with its spherical end 103 in a slot 104 in the detent 87.

An electromagnet 105 is adapted when energized to attract an armature 106 which abuts against a pin 107 secured to the end 108 of the lever 102.

Thus, when the magnet 105 is energized, the lever 102 is angularly displaced to withdraw the detent 87 from the notch.

Figure 11 shows a ventilator housing 70 having an exhaust shaft 71 and aligned exhaust outlet 72 and aligned intake shafts 73, 74. The intake and exhaust shafts are provided with stationary fairing elements 75, 76 and a pair of sleeves 77, 78 each containing a complementary fairing element 79, guide vanes 80 and propeller fan 81. The pairs of sleeves 77, 78 and their fans and motors are mounted upon a turntable 82 rotatable about a fixed pivot 83 so that one fan or the other can be brought into its position for use in alignment with the shafts as required.

It will be observed from Figures 11 and 12 that the dimensions of the housing 70 are relatively small compared with the diameters of the shafts.

An automatic electrical control gear is provided for governing the motor 40 so as to bring the carriage or turntable into its correct position when one fan is to be taken out of operation and a fresh fan brought into operation. The automatic control gear will vary somewhat according as to whether the carriage is rotatable or linearly displaceable and whether in the former case the toothed rim 42 extends completely around the periphery of the base 19 to enable the turntable to be moved in one direction of rotation only or whether the toothed rim extends only partially around the periphery which would necessitate movement of the turntable in both angular directions.

*Electrical control gear—Scheme 1*

This scheme is applicable when the turntable is moved in one direction only, i. e. when the toothing 42 extends completely around the base 19. The operating motor 40 is an A. C. commutator motor with brush gear for acceleration or deceleration, the brushes being moved by a pony motor. Six projector lamps $L_1$, $L_2$, $L_3$ and $l_1$, $l_2$, $l_3$ are arranged in diagonally opposite groups of three on the turntable as shown diagrammatically in Figure 14 whilst three photo-cells $S_1$, $S_2$, $S_3$ are fixedly disposed adjacent to the circle described by the ends of the turntable on angular displacement. The gear is controlled by press-button switches 90, 91, 92, 93 of which 90 is the main switch, 91 the stop switch, 92 the reverse switch and 93 the starting switch. On changing over from one fan to another the cycle of operations is as follows:—

The main press-button switch 90 is pressed to cause closure of a main switch 1 which withdraws the plunger 87 and provides electric supply to contactors 2, 3, 4 arranged on a main controller panel. The starting button 93 is then pressed and this energizes the coil of contactor 2 which closes the electric supply to the driving motor 40. The brush gear is arranged in such a position that the motor starts to rotate slowly and at the same time the pony motor 6 moves the brush gear into the full-speed running position which then accelerates the main motor to full speed. The closing coil of contactor 3 is also energized by pressure of the starting button 93, but a suitable time lag is provided which delays closure of this contactor for a few seconds in order to allow the projector lamps to move clear of the photo-cells. Closure of the contactor 3 puts the photo-cell equipment into operation and the turntable now rotates at top speed with the photo-cell and projector lamp circuits energized until the next row of lamps approach the photo-cells. When lamp $L_1$ comes opposite to cell $S_1$ the pony motor is reversed, brush gear brought back to start position and the main motor decelerated to a slow forward crawl.

When lamp $L_2$ comes opposite cell $S_2$ contactor 2 is de-energized to stop the motor and apply the brake. The time lag device of contactor 3 again operates and only allows this contactor to cut out after a suitable delay in case the turntable over-runs and the reversing limit $L_3$—$S_3$ is reached and required to operate in which case movement of lamp $L_3$ opposite to cell $S_3$ would cause closure of contactor 4 and reversal of the main motor at a very slow speed until lamp $L_2$ again reaches cell $S_2$, whereupon the motor is finally stopped.

After the time lag device has operated, the contactor 3 opens and the photo-cell equipment is switched off. This in turn through its protective gear opens the main switch 1 releasing the locking plunger 87 and the whole gear shuts down.

A reversing hand-button switch 92 is provided to perform the same duties as the reverse photo-cell relay $S_3$—$L_3$.

The size of a normal photo-cell unit as commercially produced is such that three such cells could not be arranged sufficiently closely together for one lamp L to perform the successive operations as it passes the three cells. It is therefore necessary to have three lamps $L_1$, $L_2$ and $L_3$, each performing one operation in the control of the apparatus. The lamps and corresponding cells are arranged on the circumferences of concentric circles, or at different heights, so that lamp $L_1$ will only come opposite cell $S_1$, lamp $L_2$ opposite cell $S_2$, and lamp $L_3$ opposite cell $S_3$. The horizontal distances between cells $S_1$, $S_2$ and $S_3$ are equal and determined by the size of the photo cell units. The distance between lamps $L_1$ and $L_2$ is so designed that after lamp $L_1$ has passed cell $S_1$ as described above, and affected the operation of slowing down the mechanism, the turn table will have to move a given distance at reduced speed before lamp $L_2$ comes opposite cell $S_2$. When this position is reached, the position of lamp $L_3$ is very slightly in front of cell $S_3$ so that a slight overrun of the mechanism will bring the slots of lamp $L_3$ and cell $S_3$ coincident and a reversal will be effected. Thus the spacing of the lamps $L_1$, $L_2$ and $L_3$ in the direction of travel of the fans is not similar to the spacing of the cells $S_1$, $S_2$ and $S_3$ in the same direction.

After a fan has been maneuvered into correct position by lamps $L_1$, $L_2$ and $L_3$, the lamps are adjacent to $S_1$, $S_2$ and $S_3$. When further rotation is carried out to bring an alternative fan into operative position, a second set of lamps $l_1$, $l_2$ and $l_3$ come into operation which perform precisely similar functions in relation to cells $S_1$, $S_2$ and $S_3$ as lamps $L_1$, $L_2$ and $L_3$.

*Emergency conditions of automatic control gear*

1. Failure of projector lamps is guarded against by providing load relays 8 in series in the lamp circuits. These are held on by current taken on the lamps and being in series can be connected into circuit with a master relay which requires to be closed or short-circuited before any starting operations can take place. If any lamp fails during rotation the effect will be equivalent to pressing "Stop" button.

This protection will introduce a condition under which it is impossible to start because the energizing of the photo-cell equipment is delayed as described and therefore will be equivalent to a condition of fault operating on the main switch which cannot be closed. The master relay of this protective circuit is therefore short circuited by a suitable contactor 5, for starting purposes. The starting operation energizes this contactor through contactor 2 with a delay action greater than that on 3 sufficient to permit the photo-cell equipment and protective gear 8 to become fully operative. Ultimate opening of contactor 5 then leaves main switch 1 held closed through protective gear 8.

When shutting down the apparatus, in order that protective gear 8 may automatically trip main switch 1 as it will do immediately contactor 3 has opened, closing of contactor 5 is again delayed sufficiently long after 3 has opened to allow the opening of main switch 1. The gear is then again in normal position for starting.

2. Failure of supply to photo-cell circuits is guarded against in a similar manner through protective gear 8.

3. Conditions under which closing of contactor 4 would cause the motor to reverse whilst gear is still rotating in a forward direction is overcome by a suitable time delay on the closing of 4 which must be less than those on 3 and 5. After 4 closes 3 and 5 are still held on by 4 instead of 2.

4. Failure to operate of photo-cell main contactor 3 would stop apparatus as under emergency condition 1 above because as soon as contactor 5 has opened the photo-cell equipment will not be in operation and protective gear 8 will shut down the apparatus.

5. Failure of contactor 5 will not prevent apparatus from working and stopping in correct position but will render inoperative the protective gear 8. It will also prevent the main switch 1 being opened at the end of the operation and prevent the locking plunger from locking apparatus. This is not of great importance but correct operation of 5 would be indicated by the lighting of a suitable indicating lamp on the control board.

6. In order that at all times the operation of the turntable may be observed an electrically operated distant indicator is provided on the control panel. This will be so arranged as to show the position of the turntable at all times.

*Scheme 2*

This scheme provides for the case where complete rotation of the turntable is not possible, i. e. where the turntable rotates through 180° on one change-over and moves back through 180° on a second change-over. This scheme is also applicable to the scheme shown in Figures 7 and 8 where the carriage 65 moves backwardly and forwardly between its two terminal positions. For this scheme it is necessary to provide either two cell equipments or to provide a duplicate set of electrical connections to the cells to enable them to operate in the order $S_1$, $S_2$, $S_3$, for movement in one direction and in the order $S_3$, $S_2$, $S_1$ in the reverse direction. For movement in one direction the start buttons perform the same sequence of operations as described under Scheme 1. For movement in the opposite direction the contactors 2 and 4 must be automatically interchangeable by suitable switching together with the cell equipments or alternatively a sequencing mechanism must be provided to take care of all necessary operations for a complete cycle from one terminal position to the other terminal position and back to the original terminal position.

*Scheme 3*

This scheme is suitable for cases where more than two fans are carried on the turntable or carriage and is similar to Scheme 1 with the exception that each fan will require a corresponding set of lamps for the purpose of controlling its position. The operation of these lamps in relation to the cells $S_1$, $S_2$, $S_3$ will be precisely as described under Scheme 1.

The photo-electric control gear described above is given as an example of one general type of control gear which may be employed.

It will be appreciated of course that the control may be effected through switches operated by mechanical gear such as skates, triggers and the like operated in dependence upon the movement of the carriage.

I declare that what I claim is:—

1. A ventilating fan assembly comprising a displaceable carriage having at least two openings therein, at least two axial-flow fans mounted on said carriage, each aligned with one of said openings, a sleeve surrounding each fan and means for displacing said carriage selectively to bring one or other of said fans and sleeves into alignment with a ventilating shaft.

2. A ventilating fan assembly comprising a turntable, a vertically directed hollow pivot for said turntable, at least two vertically directed axial flow fans mounted on said turntable, at least two sleeves on the turntable, each surrounding one of said fans, electric motors on said turntable, one for driving each fan, electrical brush and slip ring gear associated with said pivot for the supply of current to said motors and means for displacing said turntable selectively to bring one or other of said sleeves into alignment with a ventilating shaft so as to form part of such shaft with the fan associated therewith in operative position with respect to said shaft.

3. A ventilating fan assembly comprising spaced stationary shaft elements, a displaceable carriage, at least two axial-flow fans mounted on said carriage, a sleeve surrounding each fan and each adapted to extend between said shaft elements to complete the shaft, means for displacing said carriage to bring one or other of said sleeves into position between said shaft elements and means for effecting a seal between at least one of said shaft elements and a sleeve in alignment therewith, such sealing means including a sealing flange on each sleeve, arcuate sealing segments on the shaft element and springs for urging said segments towards said flange.

4. A ventilating fan assembly comprising spaced stationary shaft elements, a displaceable carriage, at least two axial-flow fans mounted on said carriage, a sleeve surrounding each fan and each adapted to extend between said shaft elements to complete the shaft, means for displacing said carriage to bring one or other of said sleeves into position between said shaft elements, fixed streamlined fairing elements in said shaft elements and a complementary fairing element in each of said sleeves and movable with said sleeves.

5. In plant for ventilating underground works such as mines and tunnels, a ventilating shaft, a turntable, a vertical pivot for said turntable, at least two vertically directed axial flow fans mounted on said turntable equidistant from said pivot, at least two sleeves on the turntable, each surrounding one of said fans and equidistant from said pivot and means for angularly displacing said turntable selectively to bring one or other of said sleeves into alignment with said ventilating shaft so as to form part of such shaft with the fan associated therewith in operative position with respect to said shaft.

CECIL BRIAN HUGH COLQUHOUN.